United States Patent
Kato et al.

(10) Patent No.: US 6,450,606 B1
(45) Date of Patent: *Sep. 17, 2002

(54) TEST PATTERN PRINTING METHOD, INFORMATION PROCESSING APPARATUS AND PRINTING APPARATUS

(75) Inventors: Masao Kato, Kawasaki (JP); Kentaro Yano, Yokohama (JP); Daigoro Kanematsu, Kawasaki (JP); Minako Kato, Yokohama (JP); Mitsuhiro Ono, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/551,875

(22) Filed: Apr. 18, 2000

(30) Foreign Application Priority Data

Apr. 19, 1999 (JP) ............................................. 11-111494

(51) Int. Cl.⁷ ......................... B41J 29/393; B41J 2/045; G03G 15/00
(52) U.S. Cl. .............................. 347/19; 347/43; 399/49
(58) Field of Search .............................. 347/15, 19, 43; 358/298

(56) References Cited

U.S. PATENT DOCUMENTS

| | | | | |
|---|---|---|---|---|
| 5,610,635 A | * | 3/1997 | Murray et al. .................. | 347/7 |
| 5,760,913 A | * | 6/1998 | Falk ............................ | 358/298 |
| 5,781,206 A | * | 7/1998 | Edge ............................ | 347/19 |

FOREIGN PATENT DOCUMENTS

JP 2661917 6/1997 ............ H04N/1/40

* cited by examiner

*Primary Examiner*—John Barlow
*Assistant Examiner*—Alfred Duddling
(74) *Attorney, Agent, or Firm*—Fitzpatrick, Cella, Harper & Scinto

(57) ABSTRACT

In a color deviation correction process, a printing apparatus prints a test pattern that allows highly accurate visual detection of a color deviation caused by output characteristic variations of individual print heads in the printing apparatus. More specifically, when patches of a test pattern are printed by mixing three colors, cyan, magenta, and yellow, the gradation value of each of the patch forming colors is changed in a gradation region close to a gradation value at which the saturation difference becomes maximum between a patch printed by the print heads having a central output characteristic with no deviation and a patch printed by deviating the gradation value of each color from the central output characteristic by a predetermined value.

35 Claims, 13 Drawing Sheets

C INCREASES →

M INCREASES ↓

| | | | | |
|---|---|---|---|---|
| C 96<br>M 96<br>Y 128<br>K 0<br>C 0<br>M 0<br>Y 0<br>K 128 | 112<br>96<br>128<br>0<br>0<br>0<br>0<br>128 | 128<br>96<br>128<br>0<br>0<br>0<br>0<br>128 | 144<br>96<br>128<br>0<br>0<br>0<br>0<br>128 | 160<br>96<br>128<br>0<br>0<br>0<br>0<br>128 |
| 96<br>112<br>128<br>0<br>0<br>0<br>0<br>128 | 112<br>112<br>128<br>0<br>0<br>0<br>0<br>128 | 128<br>112<br>128<br>0<br>0<br>0<br>0<br>128 | 144<br>112<br>128<br>0<br>0<br>0<br>0<br>128 | 160<br>112<br>128<br>0<br>0<br>0<br>0<br>128 |
| 96<br>128<br>128<br>0<br>0<br>0<br>0<br>128 | 112<br>128<br>128<br>0<br>0<br>0<br>0<br>128 | 128<br>128<br>128<br>0<br>0<br>0<br>0<br>128 | 144<br>128<br>128<br>0<br>0<br>0<br>0<br>128 | 160<br>128<br>128<br>0<br>0<br>0<br>0<br>128 |
| 96<br>144<br>128<br>0<br>0<br>0<br>0<br>128 | 112<br>144<br>128<br>0<br>0<br>0<br>0<br>128 | 128<br>144<br>128<br>0<br>0<br>0<br>0<br>128 | 144<br>144<br>128<br>0<br>0<br>0<br>0<br>128 | 160<br>144<br>128<br>0<br>0<br>0<br>0<br>128 |
| 96<br>160<br>128<br>0<br>0<br>0<br>0<br>128 | 112<br>160<br>128<br>0<br>0<br>0<br>0<br>128 | 128<br>160<br>128<br>0<br>0<br>0<br>0<br>128 | 144<br>160<br>128<br>0<br>0<br>0<br>0<br>128 | 160<br>160<br>128<br>0<br>0<br>0<br>0<br>128 |

C INCREASES →

M INCREASES ↓

| | | | | |
|---|---|---|---|---|
| C 128<br>M 125<br>Y 165<br>K 0<br>C 0<br>M 0<br>Y 0<br>K 150 | 144<br>125<br>165<br>0<br>0<br>0<br>0<br>150 | 160<br>125<br>165<br>0<br>0<br>0<br>0<br>150 | 176<br>125<br>165<br>0<br>0<br>0<br>0<br>150 | 192<br>125<br>165<br>0<br>0<br>0<br>0<br>150 |
| 128<br>140<br>165<br>0<br>0<br>0<br>0<br>150 | 144<br>140<br>165<br>0<br>0<br>0<br>0<br>150 | 160<br>140<br>165<br>0<br>0<br>0<br>0<br>150 | 176<br>140<br>165<br>0<br>0<br>0<br>0<br>150 | 192<br>140<br>165<br>0<br>0<br>0<br>0<br>150 |
| 128<br>155<br>165<br>0<br>0<br>0<br>0<br>150 | 144<br>155<br>165<br>0<br>0<br>0<br>0<br>150 | 160<br>155<br>165<br>0<br>0<br>0<br>0<br>150 | 176<br>155<br>165<br>0<br>0<br>0<br>0<br>150 | 192<br>155<br>165<br>0<br>0<br>0<br>0<br>150 |
| 128<br>170<br>165<br>0<br>0<br>0<br>0<br>150 | 144<br>170<br>165<br>0<br>0<br>0<br>0<br>150 | 160<br>170<br>165<br>0<br>0<br>0<br>0<br>150 | 176<br>170<br>165<br>0<br>0<br>0<br>0<br>150 | 192<br>170<br>165<br>0<br>0<br>0<br>0<br>150 |
| 128<br>185<br>165<br>0<br>0<br>0<br>0<br>150 | 144<br>185<br>165<br>0<br>0<br>0<br>0<br>150 | 160<br>185<br>165<br>0<br>0<br>0<br>0<br>150 | 176<br>185<br>165<br>0<br>0<br>0<br>0<br>150 | 192<br>185<br>165<br>0<br>0<br>0<br>0<br>150 |

Ps (label near the 160/140 cell region)

C INCREASES →

M INCREASES ↓

| | C increases → | | | | |
|---|---|---|---|---|---|
| C M Y K / C M Y K | 83 / 110 / 95 / 0 // 0 / 0 / 0 / 115 | 99 / 110 / 95 / 0 // 0 / 0 / 0 / 115 | 115 / 110 / 95 / 0 // 0 / 0 / 0 / 115 | 131 / 110 / 95 / 0 // 0 / 0 / 0 / 115 | 147 / 110 / 95 / 0 // 0 / 0 / 0 / 115 |
| | 83 / 110 / 110 / 0 // 0 / 0 / 0 / 115 | 99 / 110 / 110 / 0 // 0 / 0 / 0 / 115 | 115 / 110 / 110 / 0 // 0 / 0 / 0 / 115 (PS) | 131 / 110 / 110 / 0 // 0 / 0 / 0 / 115 | 147 / 110 / 110 / 0 // 0 / 0 / 0 / 115 |
| | 83 / 110 / 125 / 0 // 0 / 0 / 0 / 115 | 99 / 110 / 125 / 0 // 0 / 0 / 0 / 115 | 115 / 110 / 125 / 0 // 0 / 0 / 0 / 115 | 131 / 110 / 125 / 0 // 0 / 0 / 0 / 115 | 147 / 110 / 125 / 0 // 0 / 0 / 0 / 115 |
| | 83 / 125 / 140 / 0 // 0 / 0 / 0 / 115 | 99 / 125 / 140 / 0 // 0 / 0 / 0 / 115 | 115 / 125 / 140 / 0 // 0 / 0 / 0 / 115 | 131 / 125 / 140 / 0 // 0 / 0 / 0 / 115 | 147 / 125 / 140 / 0 // 0 / 0 / 0 / 115 |
| | 83 / 140 / 155 / 0 // 0 / 0 / 0 / 115 | 99 / 140 / 155 / 0 // 0 / 0 / 0 / 115 | 115 / 140 / 155 / 0 // 0 / 0 / 0 / 115 | 131 / 140 / 155 / 0 // 0 / 0 / 0 / 115 | 147 / 140 / 155 / 0 // 0 / 0 / 0 / 115 |

FIG. 13

TEST PATTERN PRINTING METHOD, INFORMATION PROCESSING APPARATUS AND PRINTING APPARATUS

This application is based on Japanese Patent Application No. 11-111494 (1999) filed Apr. 19, 1999, the content of which is incorporated hereinto by reference.

BACKGROUND OF THE INVENTION

1. Field of the Invention

The present invention relates to test pattern printing methods, and more specifically to a test pattern printing method to print a test pattern which is checked to detect a color deviation caused by variations in an output characteristic among several print heads, and an information processing apparatus and a printing apparatus to print the test pattern.

2. Description of the Related Art

As devices for automated office work have come into wide use, the necessity for producing color images has increased. Output devices for outputting color images are known, such as printing apparatuses of various methods, including ink jet, electro-photographic, and heat transfer methods. In recent years, these printing apparatuses have become able to output picture-like color images of relatively high quality.

Such printing apparatuses generally print color images using either three chromatic colorants, cyan (C), magenta (M) and yellow (Y), or four colorants with an additional achromatic color, black (K). The printed color image, however, may have a color deviation or color misrepresentation wherein the produced color in the printed image differs from a desired one due to an imbalance of output characteristics (e.g., reflection density or lightness, saturation, hue, etc.) among the print heads for the each respective color. In the ink jet system, for example, the print heads may have differences in an amount of heat produced by the heaters as a result of differing film thickness of the heaters, and/or differences in the size and shape of the ink ejection orifices, causing individuality in an amount of ejected ink. These differences, in turn, may result in the output characteristic imbalance among the print heads, as described above. Furthermore, these differences are not only inherent to print heads, but it is also known that these differences result over time.

To alleviate this problem of color deviation or misrepresentation, a personal computer functioning as a host computer for the printing apparatus, or the printing apparatus itself, may perform a correction process in which the host computer or printing apparatus detects the color deviation due to the differences among respective print heads and, based on the result of detection, corrects the output characteristics of the print heads to match predetermined characteristics. Such correction processing is generally carried out in two ways distinguished primarily on whether the detection of the color deviation is done by using an input device such as scanner or by a human visual check. An outline of these two correction methods, as distinguished by the way of detecting the color deviation, is briefly explained below.

The method using the input device such as scanner, for example, firstly prints a patch pattern by using the print heads of the C, M, Y and K coloring materials that are subjects of the correction, as disclosed in the official gazette of Japanese Patent No. 2661917. Then, the patch pattern is read by the scanner to detect a difference between a read value which represents an output characteristic of the head and an expected value calculated from the print data for the patch pattern. Based on the detected difference, the color deviation is corrected. The patch pattern used in this method may be a solid pattern of each of the C, M, Y, K colors or a patch pattern of each color having patches showing a gradation in density. The gradation patch pattern can also be used to detect an output characteristic with respect to a halftone, thus improving precision of detecting the color deviation. A method is also known that combines the C, M, Y and K to form second- or third-color patch patterns and thereby improves the detection and correction accuracy.

On the other hand, the method using the visual check, unlike the method using the input device, cannot easily detect an absolute value with respect to the output characteristic for each color head. Hence, a detection method that uses a third-color patch pattern printed by mixing three colorants C, M, Y is more commonly used. More specifically, a plurality of patches of almost gray color are printed. The plurality of patches include a central patch which is expected to be printed at a predetermined ratio of the three colorants (represented by print data of the three colorants) so as to be a patch of an achromatic color when printed by using print heads with an average ink ejection amount or without any deviation of ink ejection amount. The other patches are printed with their three-color ratios successively changed slightly. From the plurality of patches a user visually chooses one patch closest to the achromatic color so as to detect the patch of the most appropriate output characteristic balance among the C, M, Y color print heads. Then, the correction data corresponding to the detected patch is used to correct the output characteristic of each print head. This method of detecting the color deviation takes advantage of a fact that a slight imbalance in the output characteristics among the C, M, Y color print heads causes relatively large output characteristic changes in the patch, resulting in the patch deviating from the achromatic color.

While the problem of color deviation and the method of its detection have been described for the case of the print heads of ink jet system, differences in the output characteristics of the color print heads may also occur with printing apparatuses using electrophotographic or heat transfer systems due to causes peculiar to the principles of the respective printing systems. In these printing systems, also, the color deviation detection and correction are performed in the similar manner.

Unfortunately, the conventional color deviation detection method described above has several drawbacks.

First, in a typical environment in which the printing apparatus is used, the method using an input device such as a scanner requires that the user controls, has access to, or "owns" the input device. However, in a typical environment not all users have the input device available. Thus the method using the scanner or other input devices is not practical. Further, even if some input device is made available, the correction process on a basis of the color deviation detection using such wide variation of input devices is often very difficult to carry out.

The method based on visual check, on the other hand, does not require any special input device and thus can be employed by any user to detect color deviation. It is, however, not easy to select a patch closest to the achromatic color from the plurality of patches with their C, M, Y color ratios progressively yet slightly changed.

For example, JIS (JIS E3305, JIS Z8721, JIS L0600, etc.) and various other specifications concern a color difference ($\Delta E$). In these specifications, a range of the color difference of 3.2–6.5 is defined as a "range that can be handled as the same color in terms of impression." This suggests that visually picking a patch closest to the achromatic color from patches in this range of color difference is difficult. It is also stated that the color difference in such a range may "cause a customer to complain about difference in color when selecting paint color," suggesting that even in this range of color difference, if a wrong patch is selected, an image printed after being corrected based on a correction value corresponding to the selected patch may fail to provide a desired color.

For this reason, an effort is being made to improve an accuracy of the visual check-based color deviation detection method.

FIG. 1 is a view schematically showing an example of a test pattern that enables users to detect the color deviation with greater precision. In FIG. 1, each frame represents a patch printed with a mixture of C, M and Y colors and with K. The four numbers in each of two areas in each patch represent multi-valued gradation data for printing the associated area and correspond, from top to bottom, to C, M, Y and K. Thus, the patch shown in FIG. 1 consists of two upper and lower areas. A test pattern is made up of an array of such patches with their gradation value of M increasing vertically downward in five steps and that of C increasing horizontally toward right in five steps.

As is apparent from FIG. 1, a test area defined by the upper area in each patch is an area printed with a mixture of the C, M, Y colorants (the mixed color is hereinafter referred to as "PCBk" that is "process black"). A reference area defined by the lower area is printed with only K, the colorant of achromatic color. In the upper area printed with PCBk the gradation value of Y is fixed at a 128 level. Further, as described above, value of C in the pattern increases toward the right and value of M increases downwardly.

With the test pattern constructed in this way, the precision of visual detection can be improved. More specifically, this pattern takes advantage of a visual characteristic that when objects are close together, a small color difference can be perceived. More concretely, this pattern is based on a fact that even if the color difference is as small as 0.8–1.6, comparison between adjacent objects allows a human eye to perceive the color difference. The pattern of this method allows the user, rather than to search, without any criterion, through a plurality of patches printed with only PCBk to find a patch closest to achromatic color, to instead make one-to-one comparison between an area printed with an achromatic color K and an area printed with PCBk which areas are adjacent to each other and thereby select a patch with a PCBk area having the least color difference from the area of achromatic color K. Thus, the precision of visual detection can be improved. This method is hereinafter called an "adjacency comparison method".

As described above, the precision of visual detection of a color difference (color deviation) can generally be improved by using the adjacency comparison method. However, when it is attempted to further improve the detection precision, particularly in the two-value or binary value printing, the conventional adjacency comparison method may prove insufficient. This problem will be explained in detail as follows.

The test area of PCBk in the conventional patch is generally printed not by what is called a solid printing in which dots of each colorant are formed on all pixels, but instead by half-tone printing using an intermediate gradation value of each colorant. The half-tone printing is used for a following reason. Considering that there are errors in the positions of the dots formed and that the dots are circular in actual printing, a printing system is designed to overlap the formed dots to ensure that during the solid printing the paper surface is filled with dots so that no areas are left unprinted. That is, when a printing duty is near 100%, the coverage rate of the paper surface with the dots is about 100%, which in turn does not allow the variation in a size of the formed dot and a position of the formed dot resulting from a change of the output characteristic to be detected as a significant change. Therefore, the PCBk area is not solid-printed for each colorant dot but is often printed with gradation data that corresponds to an intermediate value of the printing duty. More specifically, of 256 gradation values represented as data of 8 bits, the data close to a value of 128 is used for printing the PCBk area. As for an adjacent area printed with the K colorant, it is desired that a difference in lightness of the adjacent area from the above-described PCBk area is not so large. Thus, the data near the gradation value of 128 is also often employed in this case.

However, if each gradation value of PCBk in the test area is simply set near 128 as described above, the color change among the test areas of the patches that form the test pattern may not be recognized satisfactorily. More specifically, even though the gradation value of the C, M and Y chromatic colorants for the PCBk in the test area is changed from one test area to another, the corresponding color difference among the test areas may not be perceptible. As a result, the output characteristic differences or changes in the print heads of the respective colorants or the printing apparatus may fail to be reflected sufficiently as a color difference among the patches in the test pattern. Thus, in the adjacency comparison the user may not be able to identify a patch that has a greatest color difference from the achromatic color of the reference area, making it impossible to detect a color deviation with high precision.

SUMMARY OF THE INVENTION

The object of the present invention is to provide a test pattern printing method, an information processing apparatus and a printing apparatus which can print a test pattern that enables highly precise visual detection of a color deviation caused by output characteristic variations of individual printing apparatus.

In the first aspect of the present invention, there is provided a test pattern printing method of printing a test pattern having a plurality of patches used in correction processing, the correction processing making an output characteristic for each of a plurality of colorants a predetermined one, based on information on a patch selected from among the plurality of patches, to correct a color deviation. The method comprises the step of: printing a plurality of patches, each of which has a test area printed by mixing the plurality of colorants, the test area indicating a degree of the color deviation, the plurality of patches being printed at different mixing ratios of the colorants wherein the mixing ratios of the colorants used to print the plurality of patches are determined so that saturation of the printed patches preferentially changes in accordance with the change in colorant mixing ratio from one patch to another.

In the second aspect of the present invention, there is provided an information processing apparatus for performing a process of printing a test pattern having a plurality of patches used in correction processing, the correction processing making an output characteristic for each of a plurality of colorants a predetermined one, based on information on a patch selected from among the plurality of patches, to correct a color deviation in printing by a printing apparatus. The apparatus comprising means for supplying data to cause the printing apparatus to print the plurality of patches, each of which has a test area printed by mixing the plurality of colorants, the test area indicating a degree of the color deviation, the plurality of patches being printed at different mixing ratios of the colorants wherein the mixing ratios of the colorants used to print the plurality of patches are determined so that saturation of the printed patches preferentially changes in accordance with the change in colorant mixing ratio from one patch to another.

In the third aspect of the present invention, there is provided a printing apparatus capable of printing a test pattern having a plurality of patches used in correction processing, the correction processing making an output characteristic for each of a plurality of colorants a predetermined one, based on information on a patch selected from among the plurality of patches, to correct a color deviation. The apparatus comprises means for printing a plurality of patches, each of which has a test area printed by mixing the plurality of colorants, the test area indicating a degree of the color deviation, the plurality of patches being printed at different mixing ratios of the colorants wherein the mixing ratios of the colorants used to print the plurality of patches are determined so that saturation of the printed patches preferentially changes in accordance with the change colorant mixing ratio from one patch to another.

According to the above configuration, when printing a plurality of patches making up the test pattern used in the color deviation correction processing, the mixture ratio of three colorants for each patch is determined so that a change in the colorant mixture ratio among the patches will preferentially result in a change in saturation. Hence, a change in the colorant mixture ratio among the patches can reflect a color difference among the patches sufficiently.

The above and other objects, effects, features, and advantages of the present invention will become more apparent from the following description of embodiments thereof taken in conjunction with the accompanying drawings.

BRIEF DESCRIPTION OF THE DRAWINGS

FIG. 1 is a diagram showing a conventional test pattern used for detecting a color deviation;

FIG. 7 is a diagram showing a test pattern for detecting color deviations according to a first embodiment of the present invention;

FIG. 13 is a diagram showing a test pattern for detecting color deviations in the second embodiment of the invention.

DESCRIPTION OF THE PREFERRED EMBODIMENTS

Embodiments of the present invention will be described by referring to the accompanying drawings.

In each of the following embodiments of the present invention, a test pattern is printed for a user, employing the adjacency comparison method, to identify from among the patches a patch with an achromatic color, i.e., a patch with a minimum saturation. Hence, the patches are printed in respective gradation ranges of C, M and Y in which a saturation difference among the test areas is large so that the color difference between the test areas of the patches in the test pattern can be recognized easily.

In addition to the above condition for the patches, it is also taken into consideration that humans are more likely to perceive a change in the lightness as a color difference rather than a change in the saturation. The patches therefore are printed in each gradation range of C, M and Y in which the lightness change is small, in order to prevent the human perception of the saturation change from being recognized as a lightness change. That is, the patches are printed in the gradation range that makes the lightness change among the patches small and the saturation change among the patches large.

In the embodiments described below, deviations in the output characteristics of the print heads of the respective colors of a printing apparatus are corrected based on information on a selected patch in the test pattern which has been generated as described above. More specifically, an output γ correction table that corresponds to the selected patch is picked from among a plurality of output γ correction tables that are set beforehand, and the table is written into the output γ correction table used for the image processing to update the table.

First Embodiment

Figure 2:
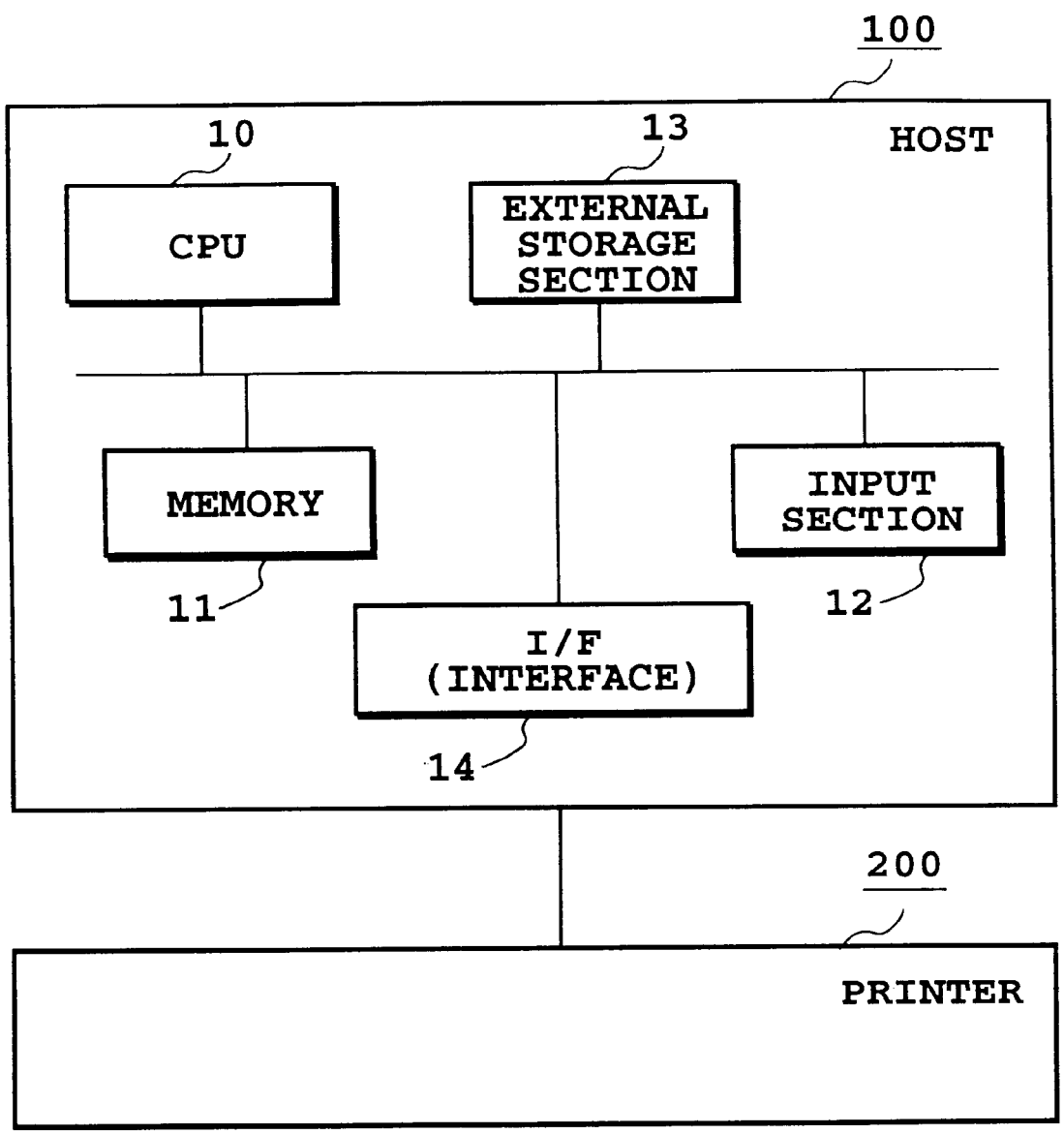
FIG. 2 is a block diagram showing an image processing system as one embodiment of the present invention.

FIG. 2 is a block diagram showing a configuration of the image processing system according to a first embodiment of the present invention.

In the figure, a host 100 as an information processing apparatus is realized by a personal computer, for example, and includes a CPU 10, a memory 11, an external storage section 13, an input section 12 such as keyboard, and an interface 14 for communication with a printer 200. The CPU 10, according to programs loaded in the memory 11, executes a variety of processings, which includes, in particular, image processing, such as color processing and quantization processing described later, and correction processing for an output characteristic pertinent to this embodiment. These programs are stored in the external storage section 13 or loaded from external devices. The host 100 is connected to the printer 200 as a printing apparatus through the interface 14 and supplies print data that has undergone the image processing to the printer 200 for printing.
<Configuration of the Printer>

Figure 3:
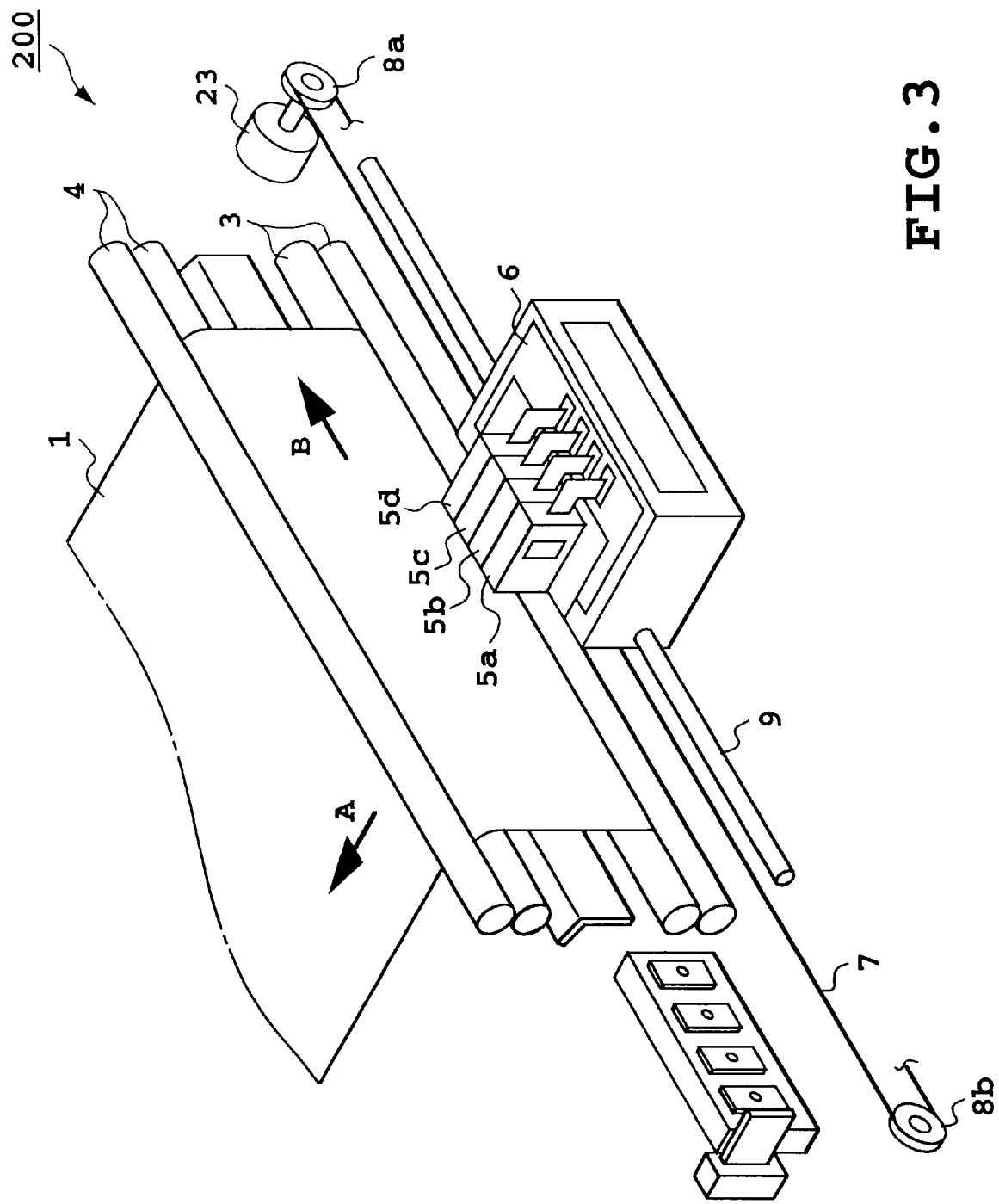
FIG. 3 is a perspective view showing a mechanism of an essential part of an ink jet printer in the image processing system.

FIG. 3 is a perspective view schematically showing a mechanical construction of the printer 200.

In FIG. 3, reference number 1 designates a recording sheet such as paper or plastic sheet. A plurality of such sheets is stacked in a cassette and, during a printing operation, the sheets are separated to be supplied as one sheet by means of feed rollers (not shown). The supplied sheet is then, by a first feed roller pair 3 and a second feed roller pair 4, fed at a predetermined distance in the direction of arrow A in the figure for each timing corresponding to scanning of a print head. Both roller pairs are arranged a predetermined interval apart and are driven by associated stepping motors (not shown).

Designated 5a, 5b, 5c and 5d are print heads of an ink jet system that eject ink against the recording sheet 1 for printing. The ink for each print head is supplied from a corresponding ink cartridge (not shown). The respective print heads are driven in response to ink ejection signals to eject inks of respective cyan(C), magenta(M), yellow(Y), black(K) from their ejection openings. To describe in more detail, in an ink path corresponding to each ejection opening of the print head is provided an electro-thermal transducer, which generates a thermal energy to form a bubble in the ink to eject ink by the pressure of the bubble. The print heads 5a, 5b, 5c and 5d and the ink cartridge are mounted on a carriage 6. The carriage 6 is driven by a carriage motor 23, the driving force of which is transmitted through a belt 7 and pulleys 8a, 8b so as to move reciprocally along a guide shaft 9 to perform scanning of the print head.

In the above construction, the print heads 5a, 5b, 5c and 5d, while being scanned in the direction of arrow B in the figure, eject respective inks onto the recording sheet 1 in response to the ink ejection signals to form ink dots oh the recording sheet 1, thus performing printing. The print heads 5a, 5b, 5c and 5d move to a home position, as required, and are subjected to an ink ejection recovery operation by an ejection recovery unit 2 to prevent or eliminate clogging of the ejection openings. Further, in synchronism with the scanning of the print heads 5a, 5b, 5c and 5d, the feed roller pairs 3, 4 are driven to feed the recording sheet 1 at a distance corresponding to one line of the scanning of the print head, in the direction of arrow A. By repeating this operation an image can be printed on the recording sheet 1.

Figure 4:
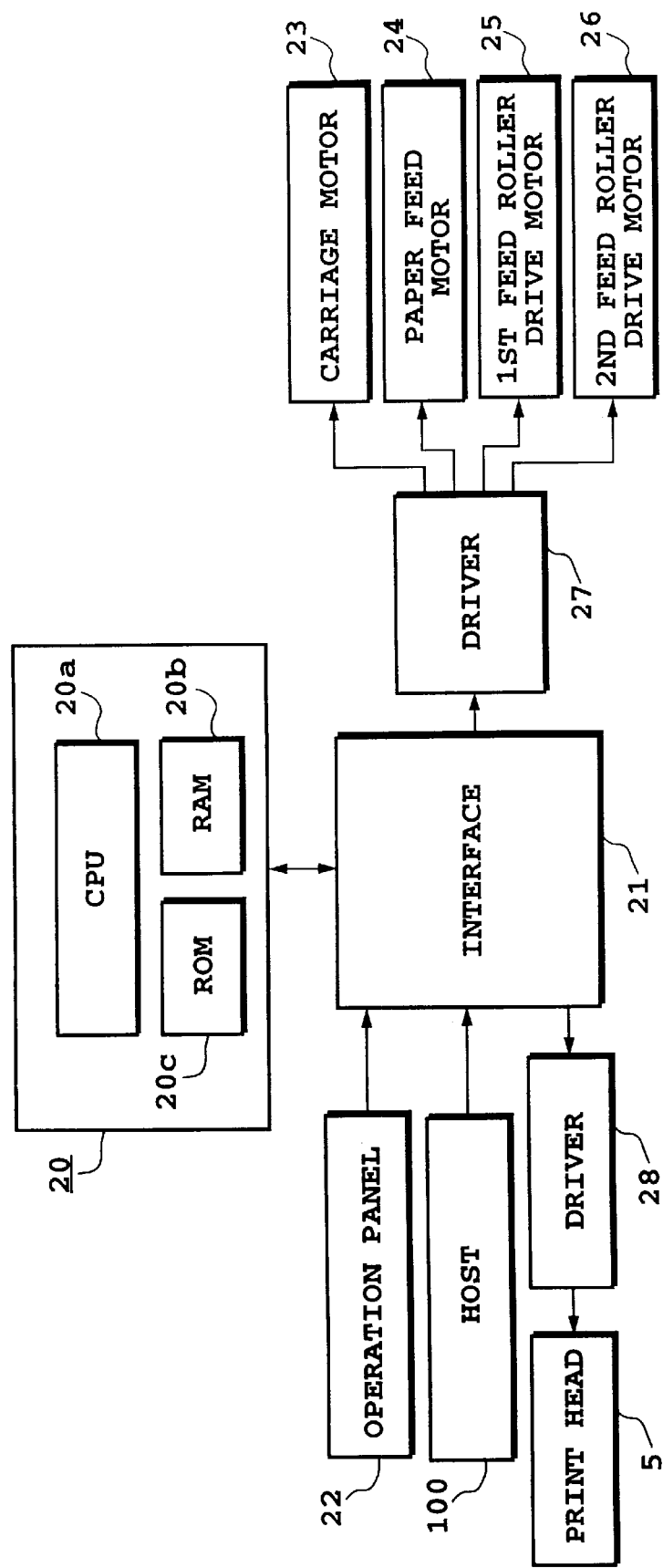
FIG. 4 is a block diagram showing a control configuration of the printer.

FIG. 4 is a block diagram showing a control configuration of the printer.

The control system, as shown in FIG. 4, has a control section 20, which includes a CPU 20a, such as microprocessor, a ROM 20b storing control programs and various data for the CPU 20a, and a RAM 20c used as a work area for the CPU 20a and temporarily storing various data such as print data. The control section 20 also includes an interface 21, an operation panel 22, a driver 27 for driving a variety of motors (carriage drive motor 23, paper feed roller drive motor 24, first feed roller pair drive motor 25, and second feed roller pair drive motor 26), and a driver 28 for driving the print head 5.

In the above configuration, the control section 20 outputs and inputs data such as print data to and from the host 100 through the interface 21, and inputs a variety of information (such as character pitch, character type, etc.) from the operation panel 22. Further, the control unit 20 outputs ON/OFF signals through the interface 21 to drive each of the motors 23–26 and also an ink ejection signal to the driver 28 to control the ink ejection operation of the print head.
<Image Processing>

Next, image processing is performed when the host 100 generates print data to be used in the printer.

Figure 5:
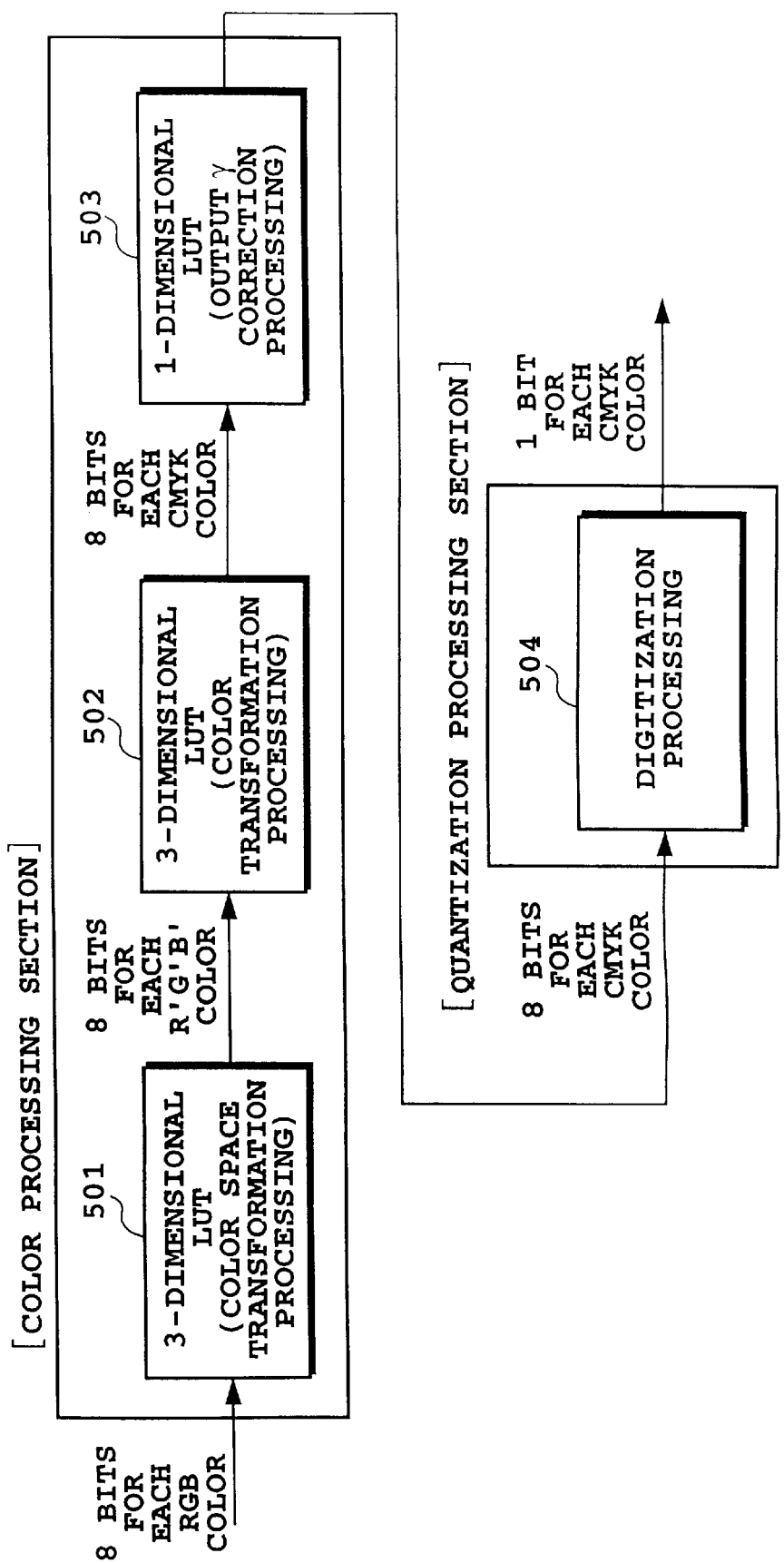
FIG. 5 is a block diagram showing an operation sequence of the image processing performed in the printer.

FIG. 5 is a block diagram showing a configuration for the image processing, by which input 8-bit image data (with 256 gradation values) for each red (R), green (G) and blue (B) color is eventually output as 1-bit image data for each color of cyan (C), magenta (M), yellow (Y), and black (K).

As shown in FIG. 5, 8-bit luminance data for each R, G, B color is first converted into 8-bit data for each R', G', B' color by using a three-dimensional lookup table (LUT) 501. The process of converting the R, G, B data into the R', G', B' data is called first-stage color processing. The object of first-stage color processing, in which a color space transformation is performed, is to correct a difference between color space of input image represented by the R, G, B luminance data and color space reproducible by the printer 200. Next, the 8-bit data for each R', G', B' color that has undergone the first-stage color processing is converted into 8-bit data for each C, M, Y, K color by using a three-dimensional LUT 502 of the next stage. This color transformation processing is called second-stage color processing. The object of second-stage color processing is to convert RGB data of an input system represented by luminance signal into CMYK data of an output system represented with density signals. Second stage color processing is necessary because the input data is usually generated as data of an additive mixing (process) of three primary colors (RGB) with respect to an illuminating element such as display and the printer on the other hand uses a subtractive mixing of three primary colors (CMY) which represents colors by the reflection of light.

Table data obtained in the three-dimensional LUTs 501 and 502 used in the first- and second-stage color processing does not cover all combinations of 8-bit data for each color because of limits on memory capacity. Instead, the LUTs are only provided for points having a predetermined spatial distance therebetween among all points represented by the above combination in the three-dimensional space. Hence, for points other than the points lying in the predetermined distance, the transformation of the 8-bit RGB data is achieved by interpolation. The interpolation is a known technique and therefore its explanation is omitted here.

The 8-bit data for each C, M, Y, K color that has undergone the second-stage processing is subjected to an output γ correction by means of a one-dimensional LUT 503 for each color. This correction process is performed because the number of dots printed in a unit area of a recording medium and an output characteristic such as reflection density are usually not linearly related. Therefore, performing the output γ correction realizes a linear relationship between the 8-bit input gradation level of each C, M, Y, K color and the density level of the printed image.

Generally, the output γ correction table prepared for a print head that performs an average output characteristic is used. However, each print head generally has output characteristic variations. Further, output characteristics among print heads vary as well. Thus, an optimum value of the γ correction parameter varies from one print head to another. For this reason, this embodiment, as described later, obtains information on a color deviation and, based on S this information, performs a correction that allows the output γ correction table to be updated. For example, when the output characteristic of the print head for the cyan (C) colorant exceeds an expected value, the one-dimensional LUT associated with the γ correction of C is modified so that the table produces a slightly lower-than-expected output value for any input value. Whereby, the γ correction performed after the modification of the table ensures that the gradation in a printed image is reproduced in conformity to the expected one even when a print head that outputs the C colorant relatively strongly is used.

After the output γ correction described above, a digitization processing 504 is performed. The printer 200 of this embodiment is a binary printing system and thus the 8-bit data for each C, M, Y, K color is quantized into 1-bit data for each C, M, Y, K color. After quantization, these binary data are sent to the printer 200 as print data for the respective print heads 5a, 5b, 5c, and 5d.

This embodiment uses an error diffusion method as a digitization technique so as to allow the printer 200 to realize a picturelike half-tone image showing smooth gradation changes. The quantization using the error diffusion method is a known art and therefore its explanation is omitted here.

<Color Deviation Detection Method and Correction Method>

Next, a color deviation detection method and a correction method based on detected color deviation information according to this embodiment will be explained.

Figure 6:
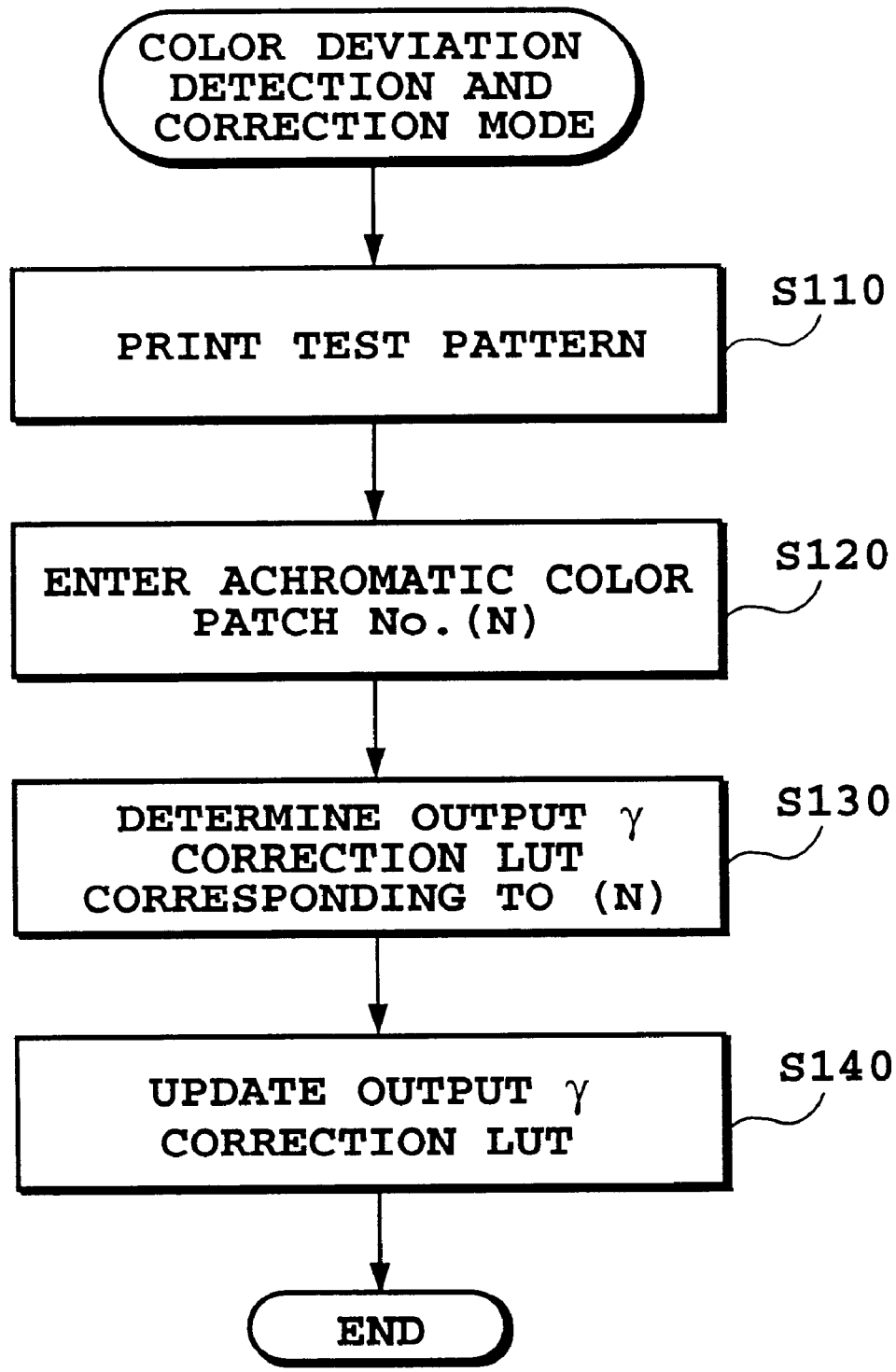
FIG. 6 is a flow chart showing a detection sequence of a color deviation and of a correction sequence of the color deviation, according to the embodiment of the present invention.

FIG. 6 is a flow chart showing processing executed in the host 100, the processing including processing for detecting a color deviation and performing correction based on the color deviation information.

The processing is started by a user-selecting this detecting and correcting mode on a user interface (UI) picture displayed by a printer driver operating on the host 100. First, at step S110 the printer 200, which is an object to be corrected, is commanded to print a detection pattern used for detecting the color deviation. More specifically, the printer driver performs the above described image processing on the detection pattern data shown in FIG. 7, which is previously set and used for detecting information of individual deference in printing characteristics, and converts the pattern data, which has undergone the image processing, into bit image data. Then, the printer driver transfers the print data of the detection pattern represented by the bit image data through the interface 14 (see FIG. 2) to the printer 200. When printing the detection pattern, the LUT for the output γ correction, which is used in the image processing, is set to a default which has a linear input/output transformation relation and which outputs the input value as is.

A detail of the detection pattern data is shown in FIG. 7. In FIG. 7, each frame represents a patch to be printed with C, M, Y, K colors at a unique mixture ratio. The respective four numbers in the upper and lower areas of each frame represent, from top to bottom, a gradation value or print data value of C, M, Y and K. These upper and lower areas make up one patch. A test pattern comprises a matrix of such patches with their gradation value of M increasing vertically downward in 15-gradation values for each of five steps and that of C increasing horizontally toward the right in 15-gradation value for each of five steps. The upper area in each of the patches represents a "test area" used as an object of visual comparison by a user, and is printed with a mixture (PCBk) of C, M, Y, K colorants. The lower area is an achromatic "reference area" serving as a reference for the comparison and is printed with a mixture of K colorant and C, M, Y colorants. The gradation value of each color shown in each patch is a print data for printing the respective area of the patch and substantially corresponds to a printing duty (a printing rate) of each C, M, Y colorant.

Detail of generating the test pattern shown in FIG. 7 is described later with reference to FIGS. 8 and 9.

Referring again to FIG. 6, after the test pattern has been printed in step S110 and a patch with the test area having a color closest to the achromatic color in the reference area of the patch that has been selected by the user's visual check, input processing for the selected patch number is performed at step S120. That is, the patch number entered by the user through the UI is stored in a predetermined memory location.

The test pattern of this embodiment is constructed in such a manner that, if the print heads have, for example, no ink ejection amount deviation, the center patch Ps (C=160, M=155, Y=165, K of the reference area=150) in FIG. 7 is selected as the patch having a test area whose color is the closest to the achromatic color. In other words, the output γ correction LUT for each color, which is used when printing the test pattern and is set to a default, is a LUT that is set under a condition in which the print heads have output characteristics (e.g., ink ejection amount) that make the test area in the patch Ps the closest to the achromatic color, i.e., a condition that the realized density balance among the colors is optimum.

In the case that a patch other than the patch Ps in the test pattern of FIG. 7 are selected as having a test area closest to the achromatic color, the printing apparatus that printed the test pattern is understood to have an output characteristic imbalance among the C, M, Y print heads (i.e., a color deviation). In this embodiment, 25 selectable patches are provided as shown in FIG. 7, and to what degree the balance of the output characteristic among the print heads of respective colors deviates can be determined by selecting a patch whose test area is closest to the achromatic color. In accordance with this configuration, this embodiment provides, in advance, 25 one-dimensional LUTs (output γ correction tables) to perform the γ correction to optimize the output characteristic balance according to the patch selected.

Therefore, at step S130 shown in FIG. 6, the output γ correction LUT to be used for the image processing is chosen from among the 25 output γ correction LUTs according to the patch number entered at step S120. Then, at step S140, the output γ correction table is updated by the chosen table. With the above processing, the detection of the color deviation and the updating the γ correction table (correction of the γ correction table) are completed.

Updating the output γ correction table is not limited to the manner of selecting the table as described above. A relation between input and output of the table may, for example, be modified by changing address information for the table. Alternatively, in a system where an active output γ correction table is copied into a predetermined memory area for the image processing, a newly selected output γ correction table may be copied into this area to update the output γ correction table. In any case, it is to be understood that the present invention is not limited by the way the output γ correction table is updated.

The generation of the test pattern according to this embodiment will be described below.

As shown in FIG. 7, the test pattern is generated so as to print the test area of each patch with the gradation value of one of three colors C, M, Y fixed while changing the gradation values of the other two colors. This embodiment is characterized by the method of determining the one color whose gradation value is to be fixed and the remaining two colors whose gradation values are to be changed, and also by the method of determining the range in which these gradation values are to be changed.

These characteristic methods will be explained by referring to FIGS. 8A, 8B and 8C and FIG. 9.

In forming an achromatic color by mixing three colors C, M, Y, the mixture ratio of three colors varies according to the gradation values of the colors. In the following, an expression "PCBk of gradation value A" is used for simplicity of explanation and, as used herein, represents when the mixed color formed when three colors are printed in an intermixing manner to form a color of the test area. With the maximum total number of dots of three colors C, M, Y and having the lowest lightness has the gradation value A=255 and the mixed color with the highest lightness (gradation value of each color=0) has the gradation value A=0. When the mixed color with such a lightness range is equally divided with the lightness taken as a reference, the value A changes from 0 to 255.

Figure 8A:
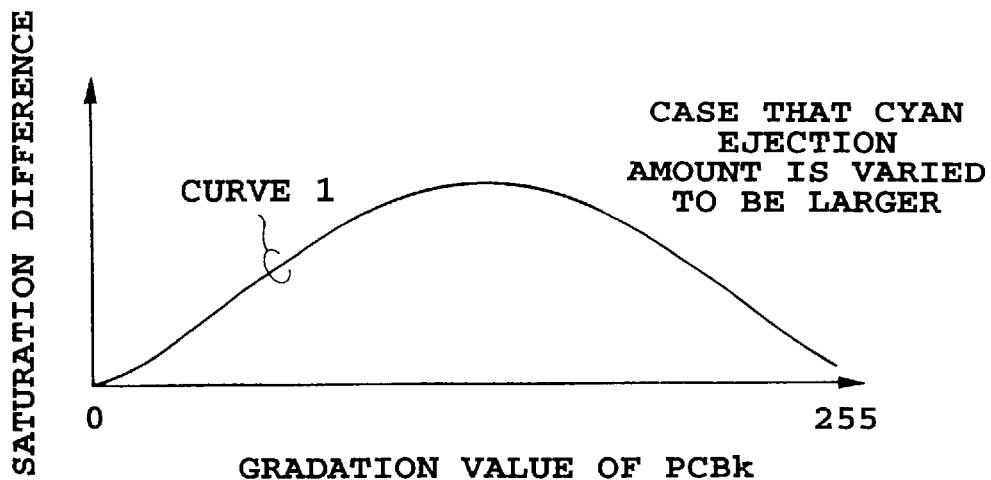
FIGS. 8A, 8B and 8C are graphs showing a change in the saturation difference when the gradation value of one of colors is increased in generating the test pattern of the first embodiment.

FIG. 8A shows a smooth curve (curve 1) that schematically represents a saturation difference between the respective PCBks of two separate print conditions. In the PCBk of the first print condition, the C, M and Y color print heads all exhibit no deviation and the print condition exhibits a central ejection characteristic. In the PCBk of the second print condition the colorant ejection amount of the cyan print head is greater than that of other print heads by a predetermined amount. By measuring and comparing the two printed PCBks at the same gradation value, a user may determine the saturation difference while changing, from 0 to 255, the gradation value. Although the real curve is not as smooth as shown due to an influence of the quantization process, ink characteristics and printing medium characteristics, it is shown as a smooth curve for simplicity of explanation.

As shown in FIG. 8, as the gradation value of PCBk increases, the saturation difference progressively increases until it reaches its peak at a middle gradation value. As the gradation value further increases, the saturation difference decreases progressively.

Figure 8B:
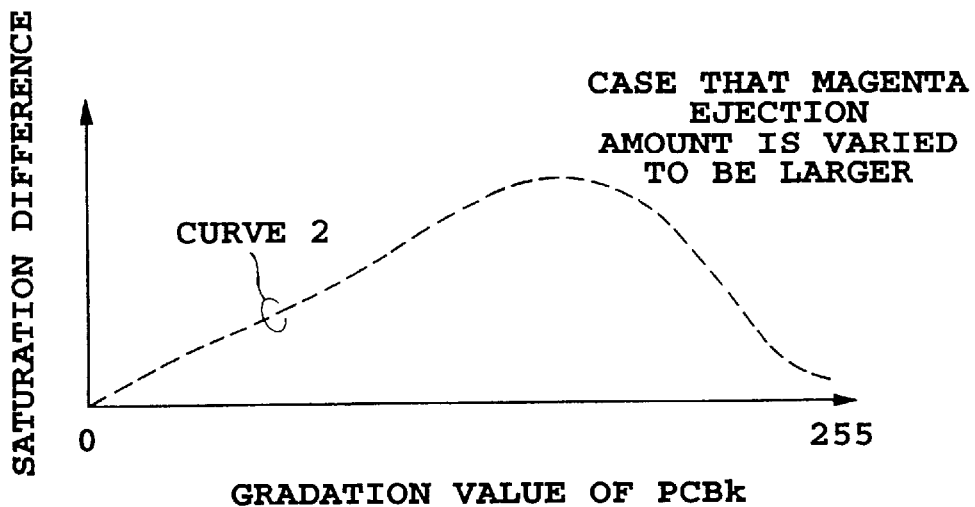
Figure 8C:
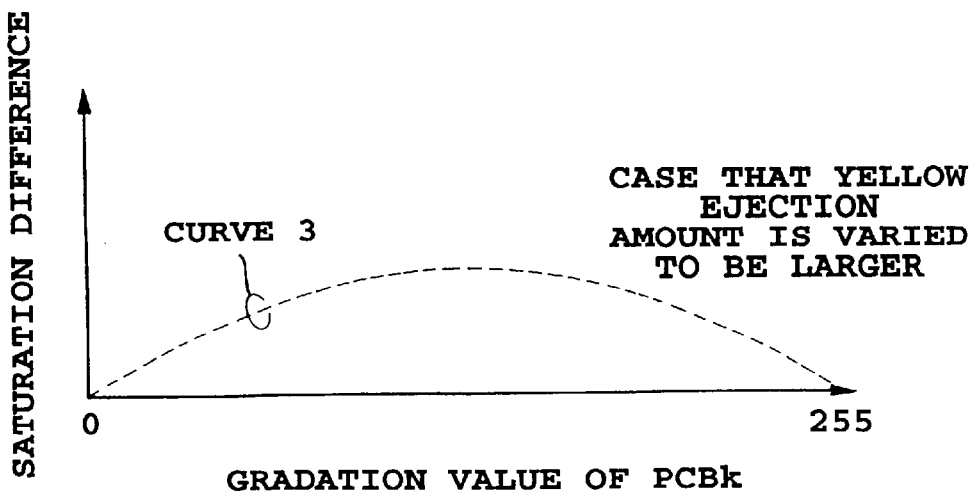

FIGS. 8B and 8C show schematically plotted smooth curves representing the relationship between the saturation difference and the gradation value of two PCBks. These curves are obtained by first printing the PCBk in the case of the C, M and Y color print heads each having a central ejection characteristic and by printing the magenta colorant in the case of FIG. 8B, or the yellow colorant in the case of FIG. 8C, in an amount greater than other two colorants by the same predetermined amount as in the case with the cyan colorant; second by determining, based on the result of color measurements, the saturation difference between the two PCBk's at the same gradation value; and by plotting the saturation difference over the gradation value range of between 0 and 255.

In these figures also, as the gradation value of each of the PCBks increases from 0, the saturation difference gradually increases until it reaches its peak at a middle gradation value. When the gradation value increases further, the saturation difference decreases.

As is seen from FIGS. 8A, 8B and 8C, the saturation differences in all three cases exhibit the same changes. It is also seen that, although the ejection amount is changed by the same amount (the predetermined amount described above) for all the C, M and Y colorants, the shape of the plotted curve (the maximum saturation difference, the gradation value at which the maximum saturation difference occurs, etc.), however, varies depending on which colorant ejection amount is changed. This is due to a variety of design items including the properties of ink dyes, their densities, permeation properties and color development characteristics on a printing medium, and an order in which inks of respective colors are ejected.

Figure 9:
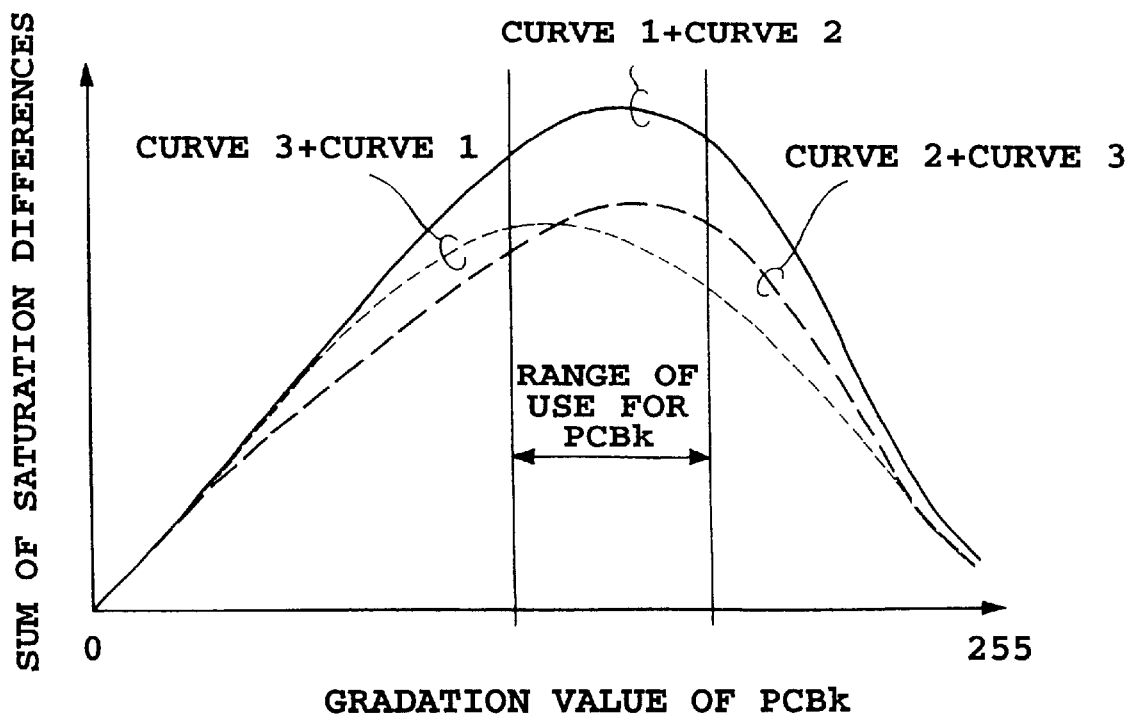
FIG. 9 is a graph showing combinations of saturation difference curves used in generating the test pattern of the first embodiment.

FIG. 9 shows three curves each representing a combination or sum of two out of the three curves—curve 1, curve 2 and curve 3—shown in FIGS. 8A, 8B and 8C.

More specifically, the three synthesized curves shown in FIG. 9 are curve 1 plus curve 2, curve 2 plus curve 3, and curve 3 plus curve 1 respectively. of these synthesized curves, the curve 1 plus curve 2 exhibits the largest value over the entire gradation range. In this embodiment, the colors corresponding to the curve 1 plus curve 2, i.e., cyan and magenta, are changed in the ejection amount of colorant and yellow is fixed when printing the test areas of the patches. The range of the gradation value for each color C, M, Y is set within a region (indicated as a "range of use" in the figure) in which the curve 1 plus curve 2 gives the largest value of saturation difference and vicinity of the largest value.

By determining the color whose colorant ejection amount is to be fixed and the other two colors whose ejection amounts are to be changed and determining the gradation range of these colors as described above, the saturation change (difference) among the printed patches produced as the two colors are changed in gradation value by predetermined amounts (the gradation value of magenta is changed by 15 units and that of cyan by 16 units) can be made large.

For example, the result shown in FIG. 8A represents the saturation difference between the PCBk printed by the C, M and Y heads all having the central ejection characteristic and the PCBk printed by increasing the colorant ejection amount for only the cyan print head when the two PCBks being compared have the same gradation values. The gradation range in which the color difference between the two PCBks can be recognized well is not a region near the gradation value of 0 or 255 but a region close to an intermediate gradation value where the saturation difference is large. Similarly, in FIGS. 8B and 8C which show the saturation differences between the two PCBks that are obtained by increasing the colorant ejection amount for only the magenta head (FIG. 8B) and only the yellow head (FIG. 8C), it is also seen that the test pattern should preferably be generated at the gradation value where the associated curve peaks and its nearby region. However, as these figures show, the gradation value at which the curve peaks differs from one parameter-changed color to another and the magnitude of the saturation difference also differs. When the test pattern is generated at a certain gradation value by changing the gradation parameters of two colors out of three while considering the balance among the three colors, it is necessary to optimize the conditions under which the gradation value for the curve's peak, the magnitude of which peak differs from one parameter-changed color to another. For this purpose, this embodiment combines two curves out of the three curves to take a sum of each two curves, as shown in FIG. 9, and compares the three synthesized curves, which exhibit increased saturation differences, to determine the optimum gradation region This produces a test pattern which, though not necessarily providing maximum sensitivity for each of the three colors, can provide a relatively large saturation difference for the two parameter-changed colors and a better visual sensitivity balance.

Although the above-described test pattern is generated based on a result of a color measurement made by changing the colorant ejection amount for each color and by measuring the printed colors, it is apparent that a similar result can also be obtained in a configuration wherein the patch is printed using the print heads with the same ejection amounts as well as changing the γ correction table and measuring the colors of the printed result. This is because changing the γ correction table causes a change in the respective amounts of ejected colorant for a unit area so that the change of respective amounts corresponds to the deviation amount for each color from the ejection amount.

FIG. 7 shows the test pattern generated as described above, which is expressed by the gradation values. In the figure, the patch Ps at the center of the test pattern has a PCBk mixture ratio in terms of gradation value that gives a peak of the curve 1 plus curve 2 in FIG. 9. Because the mixture ratios of the C and M colorants are progressively change with respect to the mixture ratio of the patch Ps set at the center as described above, the saturation difference between different patches (different test areas) can be made relatively large. It is possible to generate a test pattern with satisfactory recognizability which allows easy identification of the patch during the visual check. In more detail, the gradation value that gives the peak of the curve 1 plus curve 2 shown in FIG. 9 is made correspond to the patch Ps, and other patches are printed by changing the C and M colorant gradation values from the gradation value of this patch Ps to values within a region close to that gradation value. Therefore, the patches printed in this manner have test areas whose saturations greatly differ from that of the patch Ps depending on their positions. This in turn increases the saturation difference among the patches.

In the above embodiment, an example test pattern has been described to be made up of patches each having a test area and a reference area put adjacent to each other, with the test area being printed with PCBk colors and the reference area with an achromatic color K. It should be noted, however, that this invention is not limited to this type of test pattern. For example, the patches making up the test pattern may have only the test area printed with PCBk colors.

As described above, the test pattern of this embodiment renders the saturation difference (the color difference) between the test areas (patches) recognizable particularly well, thus allowing the user to easily identify which of the patches corresponds to the output characteristic of the present print head or printing apparatus.

Second Embodiment

In the above embodiment the gradation value of each color is determined so as to increase the saturation difference between the patches. This second embodiment takes into account a lightness difference as well as the saturation difference in determining the gradation value of each patch. This will realize a test pattern with an improved recognizability. This embodiment uses inks different from those used in the first embodiment.

Figure 10A:
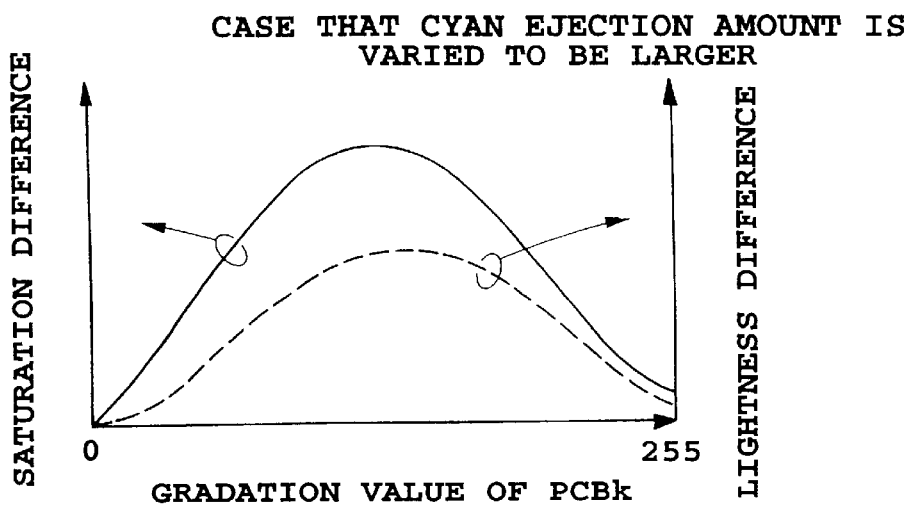
FIGS. 10A, 10B and 10C are graphs showing a change in the saturation difference and a lightness difference when the gradation value of one of colors is increased in generating a test pattern of a second embodiment of the invention.

FIG. 10A shows smooth curves that schematically represent the saturation difference and the lightness difference with respect to the gradation value of PCBk. These curves are obtained by: printing the PCBk of three mixed colors with the C, M and Y color print heads all having uniform central ink ejection characteristics and the PCBk of the three mixed colors with the ink ejection amount of only the cyan print head increased by a predetermined amount; measuring and comparing the two printed PCBks for the same gradation value to determine their saturation difference and lightness difference; repeating the above procedure for the gradation value from 0 to 255 at which to compare the two PCBks; and plotting the saturation difference and the lightness difference over the gradation range of 0 to 255.

In this FIG. 10, the saturation difference increases progressively from the gradation value of 0, as in the first embodiment, until it reaches a peak at an intermediate gradation value. As the gradation value further increases, the saturation difference decreases. The lightness difference has the similar trend but the gradation value at which the lightness difference peaks differs from the gradation value for the peak of the saturation difference.

Generally, in a gradation region where dots are sparsely formed at a low printing duty, the relation between the lightness and the saturation changes linearly with the printing duty. When the dots are formed with ink, the fixing of ink dye on the paper surface depends on the permeation of ink solvent into an inner part of the paper and its drying on the paper surface. As the printing duty is increased until the dot coverage of the paper surface exceeds 100%, ink dots overlap each other on the paper surface, shifting the dye fixing balance which depends on the permeation and the drying toward the drying side. As a result, the density of dye at the paper surface increases. When the density of dye becomes higher than necessary, the color development generally deteriorates causing the color to become dull or darkish depending on the dye density of ink and the kind of dye. Thus the linearity of the relation between the lightness and the saturation is no longer maintained. This is considered to be a cause of the two curves of FIG. 10A having different peaks.

Figure 10B:
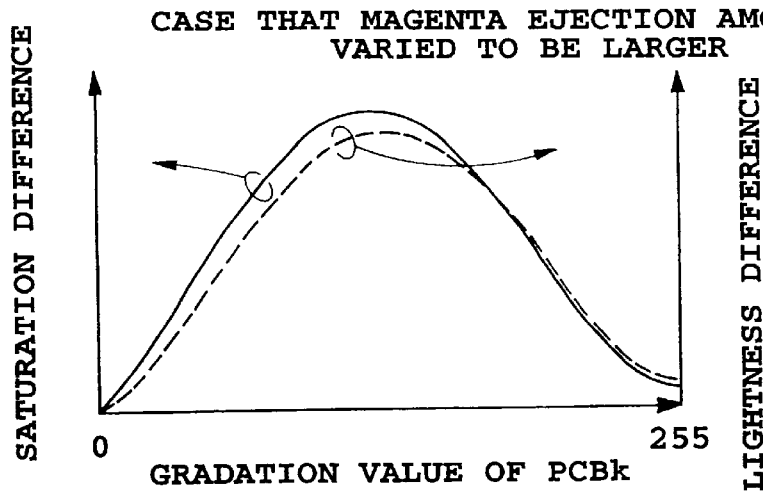
Figure 10C:
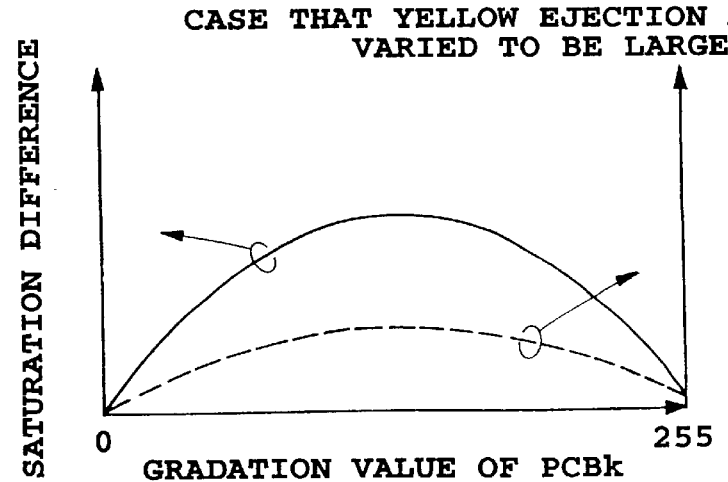

FIGS. 10B and 10C also show smooth curves that schematically represent the saturation difference and the lightness difference with respect to the gradation value of PCBk. These curves are obtained by printing the PCBk of three mixed colors with the C, M and Y color print heads all having no deviation from the central ink ejection characteristic and the PCBk of three mixed colors with the ink ejection amount of only the cyan head and the yellow head, respectively, increased by the same predetermined amount as in FIG. 10A; measuring and comparing the two printed PCBks at the same gradation value to determine their saturation difference and lightness difference; repeating the above procedure by changing the gradation value, from 0 to 255, at which to compare the two PCBks; and plotting the saturation difference and the lightness difference over the gradation range of 0 to 255.

These figures also show that the saturation difference and the lightness difference exhibit the similar trend to that of FIG. 10A. Further, these diagrams are similar to the first embodiment in that, although the ink ejection amount is changed by the same predetermined amount for each of the C, M and Y colors, the characteristics of the PCBk—the saturation difference, the lightness difference, the shape of curve (the maximum value of curve and the gradation value at which the maximum value occurs) and the relation between the two curves—vary from one parameter-changed color to another. This is caused, as described earlier, by the properties of ink dyes, their densities, permeation capabilities and color development characteristics on the printing medium, and the order in which respective color inks are ejected.

Figure 11A:
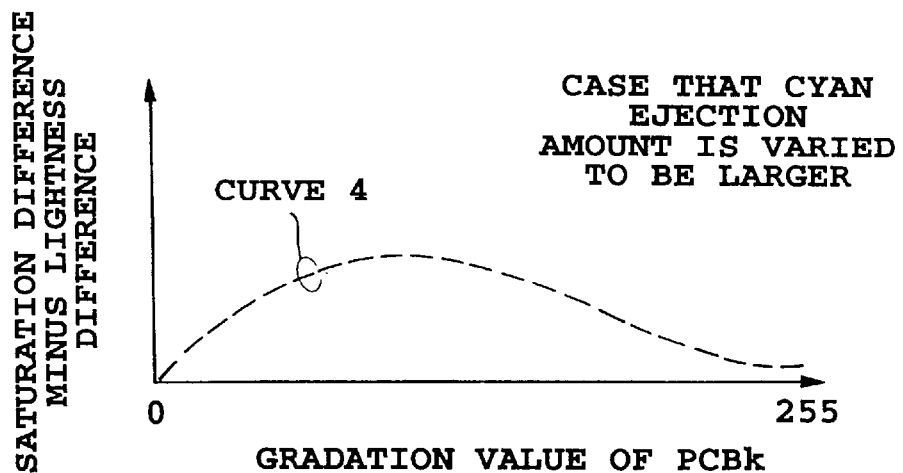
FIGS. 11A, 11B and 11C are graphs showing a change in a difference between the saturation difference and the lightness difference, or a change in the saturation difference minus the lightness difference, when the gradation value of one of colors is increased in generating the test pattern of the second embodiment of the invention.
Figure 11B:
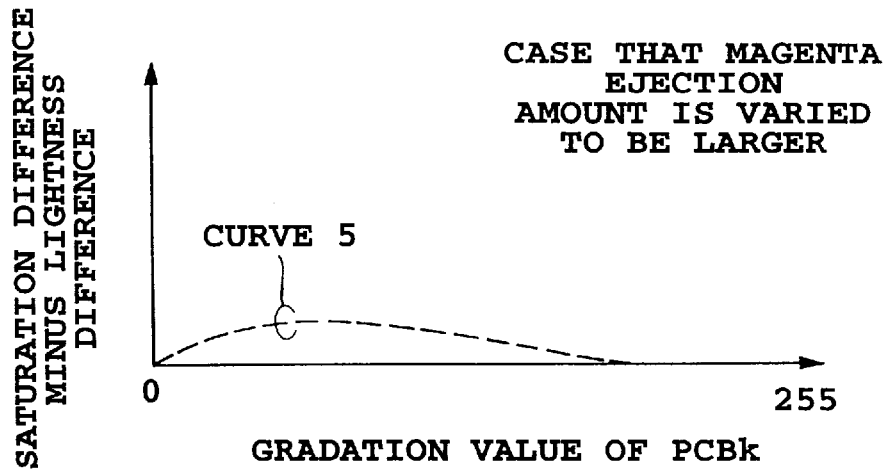
Figure 11C:
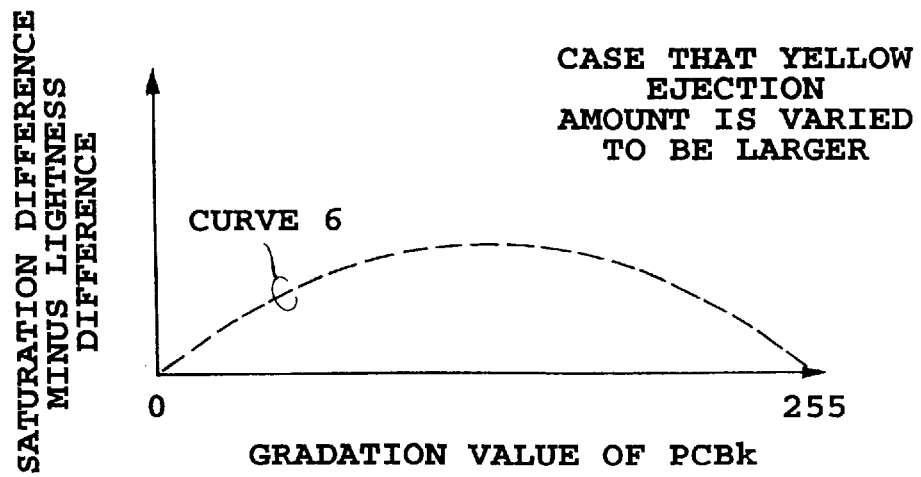

FIGS. 11A, 11B and 11C show a difference at the same gradation value between the two curves in each of FIGS. 10A, 10B and 10C, respectively, i.e., the difference between the saturation difference and the lightness difference or "saturation difference minus lightness difference" at each gradation value.

As is seen from FIGS. 10A–10C and FIGS. 11A–11C, when the ejection amount of cyan is increased, the maximum value of the saturation difference increases and thus the maximum value of "saturation difference—lightness difference" also increases. On the other hand, when the magenta ejection amount is increased, although the maximum value of the saturation difference is large, the maximum value of "saturation difference lightness difference" is small. When the yellow ejection amount is increased, although the maximum value of the saturation difference is small, the maximum value of "saturation difference lightness difference" is large.

Figure 12:
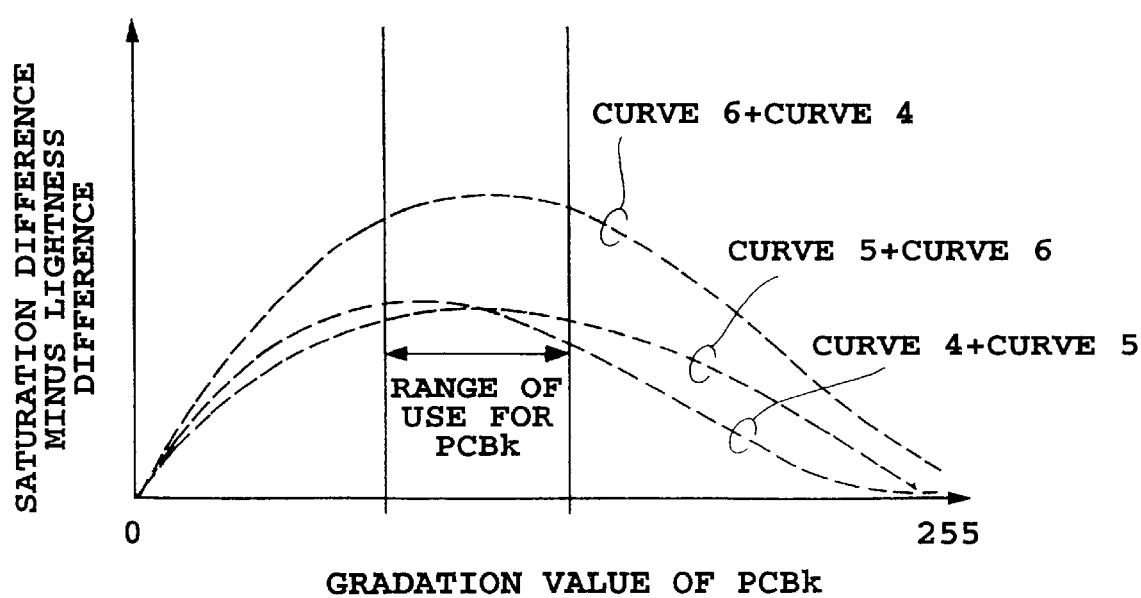
FIG. 12 is a graph showing combinations of the saturation difference and the lightness difference used in generating the test pattern of the second embodiment.

FIG. 12 shows three synthesized curves each representing the sum of two out of three curves (curve 4, 5 and 6) shown in FIGS. 11A, 11B and 11C.

More specifically, the three synthesized curves shown in FIG. 12 are curve 4 plus curve 5, curve 5 plus curve 6, and curve 6 plus curve 4. The curve that exhibits the largest value is the curve 6 plus curve 4. In this embodiment, a combination of colors corresponding to the curve 4 plus curve 6 are used. That is, the ink ejection amounts of cyan and yellow colorants are changed and magenta is fixed when printing the patches. Further, the gradation range in which the ink ejection amount is varied is set close to the gradation value at which the curve 4 plus curve 6 gives the largest value and vicinity of this gradation value (indicated as "range of use" in the figure)

Printing the patches as described above allows highly accurate detection of the color deviation.

More specifically, as already explained in the first embodiment, the gradation range in which the saturation difference is large as well as the mixed color formed in this range is desirable for the color deviation detection. It is known, however, that the human visual perception is more sensitive to a lightness change than to a saturation change. Thus, the human sense a color difference more strongly when only the lightness is changed than when only the saturation is changed by the same degree.

Hence, when the lightness as well as the saturation changes, the patch printing in this embodiment considers both the saturation difference and the lightness difference. Because the test pattern of this embodiment is designed to identify an achromatic color, a greater importance needs to be given to the color difference as perceived with the saturation taken as a reference. Therefore, in order to suppress a lightness difference influence on the detection as much as possible, the "saturation difference—lightness difference" shown in FIGS. 11A, 11B and 11C is taken as a parameter and the patches are printed in the gradation range in which the saturation difference is large, that is, a gradation range in which the saturation difference is larger than the lightness difference. That is, as this parameter value increases, the colors of different test areas look more different in terms of saturation. This means that the test pattern is more desirable.

As similar to the first embodiment, not only the gradation value for the peak of the curve but also the magnitude of the "saturation difference—lightness difference" vary from one color to another. Thus, as shown in FIG. 12, two out of three curves are combined and summed up and three synthesized curves are compared to determine the color combination and the gradation value that exhibit the greatest value. This method, although it does not necessarily provide the maximum sensitivity for each of the three colors, allows both of the two parameter-changed colors to attach a relatively greater importance to the color difference based on saturation. Therefore, the test pattern with a good visual sensitivity balance can be obtained.

The test pattern generated in this way is shown in FIG. 13.

The meaning and structure of the numbers in the test pattern are the same as those of FIG. 7. With respect to the colorants K, C, M, Y of this embodiment, the test pattern is constructed so that if the print heads for the respective colorants all have a central ejection characteristic, the patch Ps at the center position of the test pattern shown in FIG. 13 (C=115, M=110, Y=125 in test area; K=115 in reference area) is picked up as being closest to the achromatic color. When the balance in ink ejection amount among the C, M, Y and K color heads changes from that of the center patch Ps, a different patch appears closest to the achromatic color. The center patch Ps has the mixture ratio of PCBk corresponding to the gradation value that gives the peak of the curve 6 plus curve 4 shown in FIG. 12. Because the C and M mixture ratios are progressively changed from the mixture ratio of the patch Ps located at the center, the saturation difference between different test areas can be made relatively large and the lightness difference relatively small. This test pattern provides high precision with which to identify the achromatic color.

Although this embodiment has described the test pattern to have the PCBk of the test area and the K of the reference area placed adjacent to each other, the present invention is not limited to this test pattern structure and other structures of test pattern printing may also be used. Other structures for printing the test pattern may employ what has been said of the first embodiment and their descriptions are omitted here.

As described above, by generating a test pattern considering the saturation and the lightness, the test pattern can provide high precision with which to identify the achromatic color.

Third Embodiment

A further embodiment of the present invention will be described.

A significant feature of ink jet printers is the ability to print on a wide range of printing media including a plain paper, a coated paper, an OHP film and others. When the kind of printing medium changes, the conditions of color reproduction also change, which in turn changes a variety of characteristics, such as the lightness and the saturation with respect to a certain ink ejection amount and gradation level. The colors to be changed in the ink ejection amount and the center patch PCBk gradation value in the test pattern of the above embodiments are determined based on the characteristic of a particular printing medium. Hence, using for other printing medium the parameterchanged colors and the center patch PCBk gradation value of the same test pattern used for one printing medium may not produce a satisfactory result.

This embodiment deals with a case where the printing medium on which the test pattern is printed changes.

When entering the color deviation detection mode shown in FIG. 6, the user selects, on the UI screen by the printer driver, the kind of printing medium on which to print the test pattern. The printing apparatus or the host apparatus has stored therein an optimum combination of parameter-changed colors and a gradation value for each kind of printing medium beforehand and, according to the medium kind selected, selects one of the combinations to print the test pattern.

When the kind of printing medium differs, the γ correction table also differs and accordingly the change of the multi-valued gradation level among test patches, as shown in FIGS. 7 and 13, exists among different printing mediums. The parameter for each printing medium may be stored in the printing apparatus or by the printer driver. The result of the color deviation detection made in this embodiment for a particular printing medium can be reflected on an actual image printing on other printing mediums by using a known technique.

By preparing in advance a combination of parameter-changed colors and a gradation value for each kind of printing medium and selectively using an appropriate combination in this way, a stable detection of the color deviation can be ensured even when the printing medium on which the test pattern is printed is changed.

The first to third embodiments concern example cases where the print heads are of a bubble jet type of the ink jet system. It should be noted that the invention is not limited to this type of print heads. While the above embodiments have described the color deviation to be caused by the varying output characteristics of the print heads, the color deviation appearing in the printed result is also caused by a variety of other factors associated with the printing apparatus on which the print heads are mounted. In this specification the output characteristics that show in the final printed result due to these factors are also included in what is referred to as the print heads' output characteristics in the foregoing description.

The present invention is also applicable to other types of printing apparatuses with no print heads, such as those using toners as colorants.

Although in the above embodiments the print data of the test pattern is generated by the host device and the correction processing based on the user's patch selection information is performed by the host device, the invention is not limited to this configuration. For example, the above processing may be carried out by a printer as the printing apparatus and at least the printing of the test pattern may be done in the printing apparatus independently.

Other Embodiments

The present invention may be applied to a system consisting of a plurality of devices (such as a host computer, an interface device, a reader and a printer) or to single device (such as a copying machine or a facsimile).

The present invention may also be applied to a configuration in which a computer in an apparatus or system is connected to a variety of devices so as to realize functions of the foregoing examples shown in FIG. 6, is loaded with a software program and is connected to a variety of devices operated according to the program stored in the computer (CPU or MPU).

In this embodiment, the software program code itself realizes the functions of the examples shown in FIG. 6. The program code and a means for loading the program code to the computer, such as a storage medium containing a program code, constitute the present invention in this embodiment.

The storage media for storing the program code include a floppy disk, a hard disk, an optical disk, a magnetooptical disk, a CD-ROM, a magnetic tape, a nonvolatile memory card and a ROM.

The program code is included in the present embodiment not only when the functions of the aforementioned examples are realized by executing the program code loaded into the computer, but also when these functions are realized by the program code in cooperation with an OS (operating system) or application software running on the computer.

The present invention further includes an embodiment in which the program code is stored in a memory mounted on a computer's function extension board or a function extension unit connected to the computer and the CPU in the function extension board or unit executes a part or all of the actual processing according to the instructions of the program code to realize the functions of the preceding examples.

According to the embodiments of the present invention, when printing a plurality of patches making up the test pattern used in the color deviation correction processing, the mixture ratio of the three colorants for each patch is determined so that a change in the colorant mixture ratio among the patches will preferentially result in a change in the saturation. Hence, a change in the colorant mixture ratio among the patches can sufficiently reflect a color difference among the patches.

As a result, in selecting a patch in the test pattern that corresponds to the color deviation, this invention allows the user to easily recognize the color deviation as a patch color difference, thus assuring a highly accurate detection of color deviation.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A test pattern printing method of printing a test pattern having a plurality of patches and used in correction processing, the correction processing making an output characteristic for each of a plurality of colorants a predetermined one, based on information on a patch selected from among the plurality of patches, to correct color deviation, said method comprising the step of:

printing the plurality of patches, each of which has a test area printed by mixing the plurality of colorants, the test area indicating a degree of the color deviation, the plurality of patches being printed at different mixing ratios of the colorants, wherein the mixing ratios of the colorants used to print the plurality of patches are determined so that saturation of the printed patches preferentially changes in accordance with the change in colorant mixing ratio from one patch to another.

2. A test pattern printing method as claimed in claim 1, wherein the colorant mixing ratio used to print the test area of each of the plurality of patches is determined so that the test area exhibits an almost maximum saturation difference with respect to the saturation of the test area of a predetermined patch.

3. A test pattern printing method as claimed in claim 2, wherein each of the plurality of patches has placed adjacent to the test area a reference area printed with an achromatic color and serving as a reference for comparison with the associated test area.

4. A test pattern printing method as claimed in claim 3, wherein the plurality of colorants are chromatic colorants.

5. A test pattern printing method as claimed in claim 4, wherein the chromatic colorants are colorants having respective hues of cyan, magenta and yellow.

6. A test pattern printing method as claimed in claim 1, wherein the colorant mixing ratios of the plurality of patches are determined so that the saturation is given priority over lightness in changing in accordance with the change in colorant mixing ratio from one patch to another.

7. A test pattern printing method as claimed in claim 1, wherein the plurality of colorants consists of three colorants, and the colorant mixing ratio is changed by changing an application amount of each of two colorants of the three colorants, the two colorants being selected to be a combination of colorants which makes a difference of the saturation between the patches greater than other combinations of the colorants.

8. A test pattern printing method as claimed in claim 7, wherein the three colorants are cyan, magenta and yellow and the two colorants are cyan and magenta.

9. An information processing apparatus for performing a process of printing a test pattern having a plurality of patches and used in correction processing, the correction processing making an output characteristic for each of a plurality of colorants a predetermined one, based on information on a patch selected from among the plurality of patches, to correct color deviation in printing by a printing apparatus, said apparatus comprising:

means for supplying data to cause the printing apparatus to print the plurality of patches, each of which has a test area printed by mixing the plurality of colorants, the test area indicating a degree of the color deviation, the plurality of patches being printed at different mixing ratios of the colorants, wherein the mixing ratios of the colorants used to print the plurality of patches are determined so that saturation of the printed patches preferentially changes in accordance with the change in colorant mixing ratio from one patch to another.

10. An information processing apparatus as claimed in claim 9, further comprising means for making the output characteristic for each of the plurality of colorants a predetermined one to correct the color deviation, based on the information on a patch selected from among the plurality of patches.

11. An information processing apparatus as claimed in claim 9, wherein the colorant mixing ratio used to print the test area of each of the plurality of patches is determined so that the test area exhibits an almost maximum saturation difference with respect to the saturation of the test area of a predetermined patch.

12. An information processing apparatus as claimed in claim 11, wherein each of the plurality of patches has placed adjacent to the test area a reference area printed with an achromatic color and serving as a reference for comparison with the associated test area.

13. An information processing apparatus as claimed in claim 12, wherein the plurality of colorants are chromatic colorants.

14. An information processing apparatus as claimed in claim 13, wherein the chromatic colorants are colorants having respective hues of cyan, magenta and yellow.

15. An information processing apparatus as claimed in claim 9, wherein the colorant mixing ratios of the plurality of patches are determined so that the saturation is given priority over lightness in changing in accordance with the change in colorant mixing ratio from one patch to another.

16. An information processing apparatus as claimed in claim 9, wherein the plurality of colorants consists of three colorants, and the colorant mixing ratio is changed by changing an application amount of each of two colorants of the three colorants, the two colorants being selected to be a combination of colorants which makes a difference of the saturation between the patches greater than other combinations of the colorants.

17. An information processing apparatus as claimed in claim 16, wherein the three colorants are cyan, magenta and yellow and the two colorants are cyan and magenta.

18. A printing apparatus capable of printing a test pattern having a plurality of patches and used in correction processing, the correction processing making an output characteristic for each of a plurality of colorants a predetermined one, based on information on a patch selected from among the plurality of patches, to correct color deviation, said apparatus comprising:

means for printing the plurality of patches, each of which has a test area printed by mixing the plurality of colorants, the test area indicating a degree of the color deviation, the plurality of patches being printed at different mixing ratios of the colorants, wherein the mixing ratios of the colorants used to print the plurality of patches are determined so that saturation of the printed patches preferentially changes in accordance with the change in colorant mixing ratio from one patch to another.

19. A printing apparatus as claimed in claim 18, further comprising means for making the output characteristic for each of the plurality of colorants a predetermined one to correct the color deviation, based on the information on a patch selected from among the plurality of patches.

20. A printing apparatus as claimed in claim 18, wherein the colorant mixing ratio used to print the test area of each of the plurality of patches is determined so that the test area exhibits an almost maximum saturation difference with respect to the saturation of the test area of a predetermined patch.

21. A printing apparatus as claimed in claim 20, wherein each of the plurality of patches has placed adjacent to the test area a reference area printed with an achromatic color and serving as a reference for comparison with the associated test area.

22. A printing apparatus as claimed in claim 21, wherein the plurality of colorants are chromatic colorants.

23. A printing apparatus as claimed in claim 22, wherein the chromatic colorants are colorants having respective hues of cyan, magenta and yellow.

24. A printing apparatus as claimed in claim 23, further comprising print heads, one for each of the plurality of colorants, to be used for printing.

25. A printing apparatus as claimed in claim 24, wherein the print heads eject ink to form dots.

26. A printing apparatus as claimed in claim 25, wherein each of the print heads uses thermal energy to generate a bubble and ejects ink by a pressure of the bubble.

27. A printing apparatus as claimed in claim 18, wherein the colorant mixing ratios of the plurality of patches are determined so that the saturation is given priority over lightness in changing in accordance with the change in colorant mixing ratio from one patch to another.

28. A printing apparatus as claimed in claim 18, wherein the plurality of colorants consists of three colorants, and the colorant mixing ratio is changed by changing an application amount of each of two colorants of the three colorants, the two colorants being selected to be a combination of colorants which makes a difference of the saturation between the patches greater than other combinations of the colorants.

29. A printing apparatus as claimed in claim 28, wherein the three colorants are cyan, magenta and yellow and the two colorants are cyan and magenta.

30. A storage medium storing a program readable by an information processing apparatus, a processing of the program being a test pattern printing processing for printing a test pattern having a plurality of patches and used in correction processing, the correction processing making an output characteristic for each of a plurality of colorants a predetermined one, based on information on a patch selected from among the plurality of patches, to correct color deviation, said processing comprising the step of:

printing a plurality of patches, each of which has a test area printed by mixing the plurality of colorants, the test area indicating a degree of the color deviation, the plurality of patches being printed at different mixing ratios of the colorants, wherein the mixing ratios of the colorants used to print the plurality of patches are determined so that saturation of the printed patches preferentially changes in accordance with the change in colorant mixing ratio from one patch to another.

31. A storage medium as claimed in claim 30, wherein the plurality of colorants consists of three colorants, and the colorant mixing ratio is changed by changing an application amount of each of two colorants of the three colorants, the two colorants being selected to be a combination of colorants which makes a difference of the saturation between the patches greater than other combinations of the colorants.

32. A storage medium as claimed in claim 31, wherein the three colorants are cyan, magenta and yellow and the two colorants are cyan and magenta.

33. A program for causing an information processing apparatus to execute a test pattern printing processing of printing a test pattern having a plurality of patches and used in correction processing, the correction processing making an output characteristic for each of a plurality of colorants a predetermined one, based on information on a patch selected from among the plurality of patches, to correct color deviation, said processing comprising the step of:

printing the plurality of patches, each of which has a test area printed by mixing the plurality of colorants, the test area indicating a degree of the color deviation, the plurality of patches being printed at different mixing ratios of the colorants, wherein the mixing ratios of the colorants used to print the plurality of patches are determined so that saturation of the printed patches preferentially changes in accordance with the change in colorant mixing ratio from one patch to another.

34. A program as claimed in claim 33, wherein the plurality of colorants consists of three colorants, and the colorant mixing ratio is changed by changing an application amount of each of two colorants of the three colorants, the two colorants being selected to be a combination of colorants which makes a difference of the saturation between the patches greater than other combinations of the colorants.

35. A program as claimed in claim 34, wherein the three colorants are cyan, magenta and yellow and the two colorants are cyan and magenta.

* * * * *

UNITED STATES PATENT AND TRADEMARK OFFICE
CERTIFICATE OF CORRECTION

PATENT NO.    : 6,450,606 B1                                    Page 1 of 1
DATED         : September 17, 2002
INVENTOR(S)   : Kato et al.

It is certified that error appears in the above-identified patent and that said Letters Patent is hereby corrected as shown below:

Column 7,
Line 39, "oh" should read -- on --.

Column 9,
Line 34, "above described" should read -- above-described --.

Column 12,
Line 3, "of" should read -- Of --.
Line 51, "region" should read -- region. --.

Column 13,
Line 7, "change" should read -- changed --.

Column 15,
Line 15, "figure)" should read -- figure). --.
Line 24, "the human" should read -- humans --.

Column 16,
Line 37, "parameterchanged" should read -- parameter-changed --.

Signed and Sealed this

Fourth Day of March, 2003

JAMES E. ROGAN
*Director of the United States Patent and Trademark Office*